United States Patent [19]
Marshall

[11] 3,818,336
[45] June 18, 1974

[54] HIGH VOLTAGE MEASURING APPARATUS
[75] Inventor: Neil A. Marshall, San Jose, Calif.
[73] Assignee: International Telephone and Telegraph Corporation, New York, N.Y.
[22] Filed: Aug. 14, 1972
[21] Appl. No.: 280,160

[52] U.S. Cl.................. 324/118, 324/120, 330/10
[51] Int. Cl....................... G01r 19/18, G01r 19/26
[58] Field of Search ............... 324/120, 118; 330/10

[56] References Cited
UNITED STATES PATENTS

| | | | |
|---|---|---|---|
| 2,613,236 | 10/1952 | Palevsky et al. | 324/118 |
| 2,787,742 | 4/1957 | Fransen | 324/118 |
| 2,903,523 | 9/1959 | Toomin et al. | 324/118 |
| 3,254,292 | 5/1966 | Ohata | 324/120 |
| 3,290,595 | 12/1966 | Novotny | 324/120 |
| 3,404,341 | 10/1968 | Young | 324/118 |

*Primary Examiner*—Alfred E. Smith
*Assistant Examiner*—Ernest F. Karlsen
*Attorney, Agent, or Firm*—A. Donald Stolzy

[57] ABSTRACT

A high voltage circuit is established including a resistor and a variable capacitor adapted for connection in series with an unknown high voltage D.C. source. The capacitance of the variable capacitor is varied by a speaker excited by an A.C. source. A D.C. blocking capacitor is connected from the junction of the variable capacitor and the resistor. The A.C. voltage across the resistor or the variable capacitor is then impressed through the D.C. blocking capacitor on an A.C. voltage measuring or indicating circuit which may include a synchronous detector connected from the A.C. source, and a D.C. voltmeter connected from the synchronous detector and calibrated to read in the voltage of the D.C. source.

2 Claims, 3 Drawing Figures

PATENTED JUN 18 1974　　　　　　　　　3,818,336

HIGH VOLTAGE MEASURING APPARATUS

BACKGROUND OF THE INVENTION

This invention relates to the art of high voltage measurement or the like, and more particularly, to apparatus for producing an output signal of a magnitude which is a function of the amplitude of the output of an unknown high voltage D.C. source.

In the past, high voltage D.C. measurements by vibrating reed electrometers have not been reliable. Electrostatic methods used in the past have had limited ranges and have been large and cumbersome. When a high series resistance and a microammeter are employed, the unknown is loaded severely and power consumption is too high. Other prior art arrangements are sensitive to vibration.

SUMMARY OF THE INVENTION

In accordance with the present invention, the above-described and other advantages of the prior art are overcome by providing a resistor and a variable capacitor for connection in series with a high voltage D.C. source.

The capacitance of the variable capacitor is varied. The alternating component of the voltage across either the resistor or the variable capacitor then has an amplitude directly proportional to the amplitude of the D.C. source.

A voltmeter or other equivalent device may be employed to indicate the magnitude of the said alternating component.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
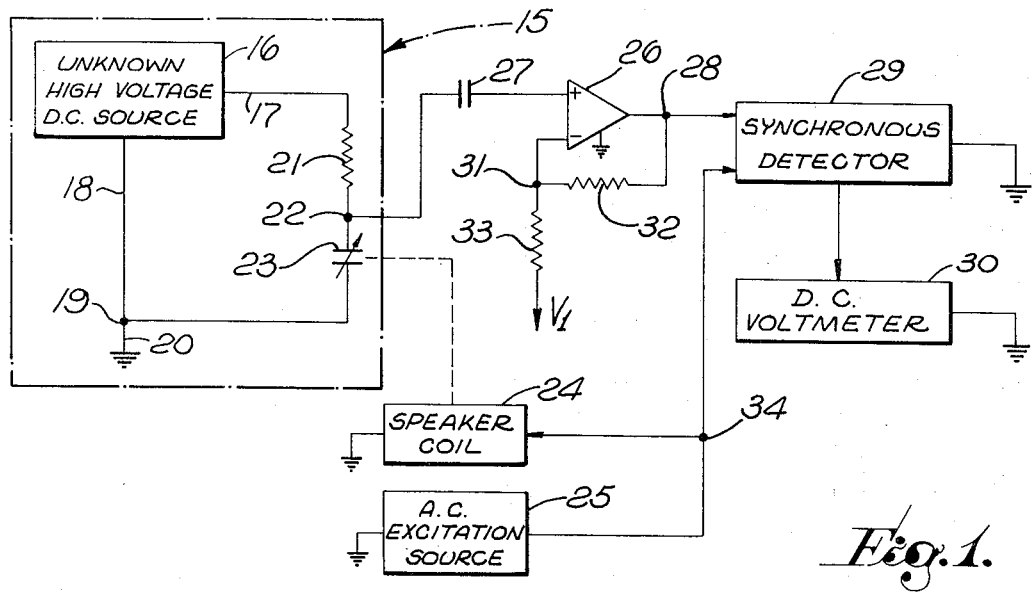
FIG. 1 is a block diagram of one embodiment of the present invention.

In FIG. 1, a high voltage circuit is indicated at 15 including a high voltage D.C. source of potential 16. Source 16 produces a D.C. output voltage which is to be measured. Source 16 has one output lead 17 and another output lead 18, output lead 18 being connected to a junction 19 which is grounded at 20. A resistor 21 is connected from lead 17 to a junction 22. A variable capacitor 23 is connected from junction 19 to junction 22.

The capacitance of capacitor 23 is varied in accordance with a periodic function by a speaker coil 24. Speaker coil 24 is driven by an A.C. excitation source 25 having, for example, a sine wave output signal. Junction 22 is connected to the noninverting input of a differential amplifier 26 via a D.C. blocking capacitor 27. Alternatively, amplifier 26 may be source follower. The output of amplifier 26 is connected to a junction 28. Junction 28 is connected to a synchronous detector 29 which also receives another input from the output of source 25. The output of synchronous detector 29 is then impressed upon a D.C. voltmeter 30. Alternatively, D.C. voltmeter 30 may be an analog-to-digital converter connected to digial display apparatus.

Another junction 31 is shown in the circuit connected to the inverting input of amplifier 26. A feedback resistor 32 is connected between junctions 28 and 31. A resistor 33 is connected from junction 31 to a reference potential $V_1$.

OPERATION

In the operation of the embodiment of FIG. 1, the capacitance of capacitor 23 may be varied with time or as some function of $\sin\omega t$ if the output signal of source 25 is also some function of $\sin\omega t$, $\omega$ being $2\pi f$, where $f$ is the frequency of source 25, $t$ being time.

After source 16 has been connected across the resistor 21 and capacitor 23, and source 25 is providing its output signal, the charge on capacitor 23 will settle down to a periodic function. The same is true of the voltage across either capacitor 23 or across resistor 21. The same is true of the current through resistor 21 and, thus, the rate of change of charge on capacitor 23.

The alternating component then of the voltage across capacitor 23 is then impressed upon amplifier 26 through D.C. blocking capacitor 27. The output of amplifier 26 is impressed upon synchronous detector 29.

Synchronous detector 29 is entirely conventional. The output of amplifier 26 at junction 28 is, thus, sampled by synchronous detector 29 over a period short in comparison to the fundamental. Sampling takes place at the fundamental frequency. The sampled value is held by a capacitor. The output of synchronous detector 29 is, thus, a D.C. voltage. Although it is not obvious, the D.C. voltage at the output of the synchronous detector 29 is much lower than the output voltage of source 16. Yet, the D.C. voltage at the output of the synchronous detector 29 is directly proportional to the magnitude of the output voltage of source 16. Thus, voltmeter 30 may be calibrated to read directly to indicate visually the magnitude of the output voltage of source 16.

If desired, a variable phase shifter may be inserted between a junction 34 and synchronous detector 29. Such a phase shifter may be varied to produce a maximum output from synchronous detector 29 for optimum sensitivity, if desired. However, this will not be necessary in many cases.

THE HIGH VOLTAGE CIRCUIT OF FIG. 2

Figure 2:
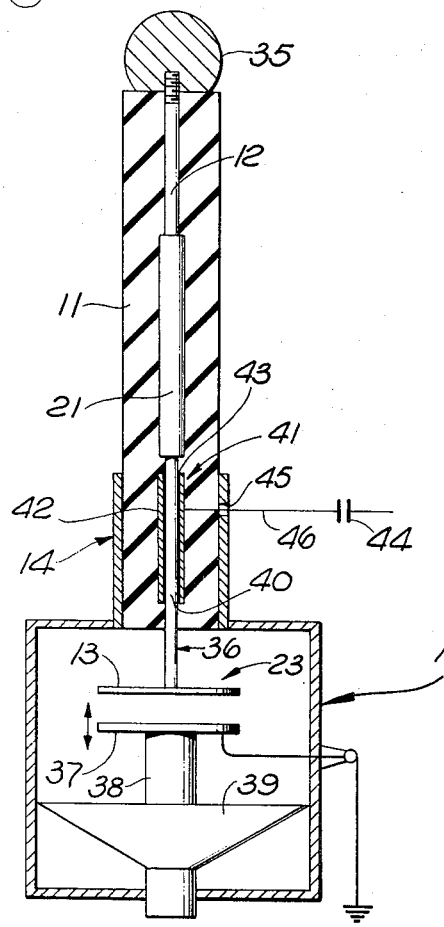
FIG. 2 is a vertical sectional view through the high voltage circuit of the present invention.

The high voltage circuit 15 is shown in FIG. 2 including an input conductor 35 spaced from a conductive housing 10 by an insulator body 11 fixed relative to both. Body 11 may be made of an epoxy, if desired. Body 11 encases the high voltage resistor 21, and center post 12 which is a conductor that connects conductor 35 with one end of resistor 21. A conductor 36 is also embedded in body 11 and connects the lower end of resistor 21 with a fixed electrode 13 of capacitor 23.

Capacitor 23 has a movable electrode 37 that is fixed to a post 38 that is moved by, for example, a small cone speaker 39 mounted in housing 10, and having fixed portions thereof fixed relative to housing 10.

Conductor 36 may, if desired, be a right cylinder. Conductor 36 has a portion 40 which forms one electrode of a capacitor 41 having another electrode 42. Electrode 42 is a hollow right cylinder having a concentric hole therethrough. Between electrodes 40 and 42 of capacitor 41, a dielectric 43 is located. The connection of a conventional ceramic high voltage decoupling capacitor 44 between capacitors 41 and 26 in FIG. 1 is optional.

A guard ring or conductive cylinder 14 isolates capacitor electrode 42 from capacitor 44.

Cylinder 14 has a hole therethrough at 45 through which a lead 46 from electrode 42 passes.

THE ALTERNATIVE EMBODIMENT OF FIG. 3

Figure 3:
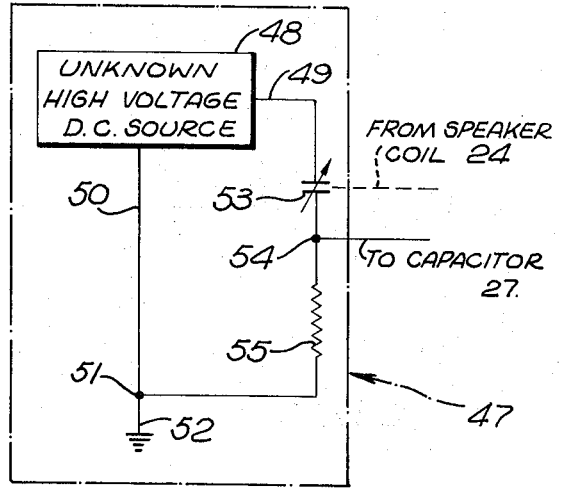
FIG. 3 is a schematic diagram of an alternative high voltage circuit constructed in accordance with the present invention.

An alternative embodiment of the high voltage circuit 15 in FIG. 1 is indicated at 47 in FIG. 3 including an unknown high voltage D.C. source 48 having outout leads 49 and 50. Lead 50 is connected to junction 51. Junction 51 is grounded at 52. A capacitor 53 is connected from lead 49 to an output junction 54. A resistor 55 is connected from junction 54 to junction 51. Capacitor 53 may then be connected from speaker coil 24, as before. Junction 54 may then be connected to capacitor 27, as before.

The circuit 47 of FIG. 3 shows that the A.C. component of the voltage appearing at junction 54 with respect to ground or to some reference potential may be taken across either capacitor 23, as shown in FIG. 1, or resistor 55, as shown in FIG. 3.

The phrase "utilization means" as used herein is hereby defined to include any means for performing a function which is desired in accordance with changes in the magnitude of the output voltage of an unknown high voltage D.C. source. Thus, in accordance with this definition, it may be possible to control any device or apparatus open end, or to control the magnitude of the output voltage of the unknown D.C. source. All these functions, therefore, fall within the herein definition of "utilization means" as well as the indicating function thereof.

As disclosed herein, "utilization means" may then include any one or more of the component parts of the invention outside the high voltage circuits described herein including, but not limited to, voltmeter 30.

The high voltage circuit may be analyzed as follows.

If the variable capacitor has a capacitance, $C$, then $$C = f_1(t) \quad (1)$$

where $f_1(t)$ is some periodic function of time, $t$.

Defining $$f_1(t) = [1/f_2(t)] \quad (2)$$

a Fourier series may be developed $$f_2(t) = A_a + A_{a1} \sin(\omega t + \phi_{a1}) + A_{a2} \sin(2\omega t + \phi_{a2}) \ldots \quad (3)$$

where,
$A_{an}$ and $\phi_{an}$ are constants,
$\omega = 2\pi f$,
$\pi = 3.1416$, and
$f$ is the frequency of the A.C. source.

Defining a related Fourier series $$f_3(t) = f_2(t) - A_{a0} \quad (4)$$

and substituting $$f_2(t) = A_{a0} + f_3(t) \quad (5)$$

into (2) and (2) into (1)

$$C = [1/A_{a0} + f_3(t)] \quad (6)$$

It is important to remember that $f_3(t)$ when expanded into a Fourier series has no constant term. Note that $f_3(t)$ max. is never greater than $A_{a0}$ and $A_{a0} \neq 0$ because $C$ is never infinite.

The charge $Q$ on the variable capacitor is related to the voltage $V$ thereacross by the capacitance $C$ as follows.

$$Q = CV \quad (7)$$

According to Kirchoff's law $$E = iR + V \quad (8)$$

where current $i$ is defined $$i = dQ/dt \quad (9)$$

and $E$ is the high voltage, and $R$ is the resistance of the high voltage resistor.

Thus, $$V = Q/C \quad (10)$$

Substituting (9) and (10) in (8)

$$(dQ/dt) + (1/RC) Q = E/R \quad (11)$$

Equation (11) is a differential equation of a well known type which has the general solution $$Q = Ke^{-\phi} + (E/R) e^{-\phi} \int e^{\phi} \, dt \quad (12)$$

where $$\phi = \int dt/RC \quad (13)$$

and $e = 2.7128$, and $K$ is a constant.

Substituting (6) into (13)

$$\phi = \int [A_{a0}/R + f_3(t)/R] \, dt \quad (14)$$

$$\phi = (A_{a0}/R) t + 1/R \int f_3(t) \, dt \quad (15)$$

In (15) assume $f_3(t)$ is in its Fourier series form. Thus, $+ 1/R \int f_3(t)dt$ does not contain any constant term because $f_3(t)$ does not, and because, for example $$\int A_{an} \sin(n\omega t + \phi_{an}) dt = (-A_{an}/n\omega) \cos(n\omega t + \phi_{an}) \quad (16)$$

Defining $$r = A_{a0}/R \quad (17)$$

and $$s = 1/R \int f_3(t) dt \quad (18)$$

note that $s$ contains no constant term.
From (15), $$\phi = rt + s \quad (19)$$

From (12), $$Q = K e^{-rt - s} + (E/R) e^{-rt - s} \int e^{rt + s} dt \quad (20)$$

Consider $e^{rt + s}$ the product, $$e^{rt} \times e^s \quad (21)$$

The term $e^s$ may be expanded into a Fourier series $$e^s = A_{b0} + A_{b1} \sin(\omega t + \phi_{b1})$$
$$+ A_{b2} \sin(2\omega t + \phi_{b2}) \ldots \quad (22)$$

The integral $\int e^{rt} e^s dt$ may then be evaluated by integrating the product of $e^{rt}$ and each individual term of (22). This can be done by so-called simple integration.

The constant term integrates $$\int e^{rt} (A_{b0}) dt = A_{b0}/r \, e^{rt} \quad (23)$$

The sine terms integrate $$\int e^{rt} [A_{bn} \sin(n\omega t + \phi_{bn})] dt = (A_{bn} e^{rt} / \sqrt{r^2 + n^2 \omega^2})$$
$$\sin[n\omega t + \phi_{bn} - \arctan(n\omega/r)] \quad (24)$$

Note that the right-hand side of both equations (23) and (24) contain the term $e^{rt}$. Note the $e^{-rt}$ outside the integral in the right-hand term on the right side of equation (20). The product of these two factors is, thus, unity. That is $e^{rt} \times e^{-rt} = 1$. Charge $Q$ then is $$Q = K e^{-rt - s} + (E/R) e^{-s} f_4(t) \quad (25)$$

where $f_4(t)$ is a Fourier series.
From (10) and (25), $$V = K e^{-rt - s}/C + (E/R)(1/C) e^{-s} f_4(t) \quad (26)$$

$$iR = E - V \quad (27)$$

For $iR$ or $i$, substitute (26) in (27).
In (26), the term $K(e^{-rt - s}/C)$ is a transient term because of the negative exponent $-rt$. After the capacitor has built an adequate average charge, this term goes to zero (as explained previously, $C$ is never zero).
The steady state (still periodic) voltage $V_s$ is then $$V_s = (E/R)(1/C) e^{-s} f_4(t) \quad (28)$$

Note that none of the variables $C$, $s$ and $f_4(t)$ are functions of $E$.
It can be shown that the product of two Fourier series is another Fourier series. This is true because of the trigonometric identity $$\sin px \sin qx = \tfrac{1}{2} \cos(p - q)x - \tfrac{1}{2} \cos(p + q)x \quad (29)$$

In accordance with the foregoing, both $(1/C)$ and $e^{-s}$ may be converted to Fourier series.
The product of $e^{-s} f_4(t)$ in series form may be represented by $f_5(t)$. The product $(1/C) f_5(t)$ may then be represented in series form $f_6(t)$. Thus, $$V_s = (E/R) f_6(t) \quad (30)$$

From (30), it is evident that each term of the Fourier series for $V_s$ is then directly proportional to the high voltage $E$.
If it is desired to measure the peak amplitude of the fundamental as described herein and $$f_6(t) = A_{c0} + A_{c1} \sin(\omega t + \phi_{c1}) \ldots \quad (31)$$

then the peak voltage of the fundamental as a percent of the average will then be $$A_{c1}/A_{c0} \times 100 \quad (32)$$

The foregoing proof is not limited to $f_3(t)$ being any particular function of $t$. The only requirement is that $f_3(t)$ be periodic, i.e., susceptible of a Fourier analysis. However, it is very likely that, due to the faithful reproduction of a sine wave by the speaker, $$f_3(t) = K_1 \sin \omega t \quad (33)$$

where $K_1$ is a constant.
It is known that the capacitance $C$ of a parallel plate capacitor is $$C = K_2/T_s \quad (34)$$

where $K_2$ is a constant and $T_s$ is the plate spacing. The spacing never goes to zero. Thus, it is likely that $$T_s = T_p + T_q \sin \omega t \quad (35)$$

where $T_p$ and $T_q$ are constants.
Putting (35) in (34), $$C = K_2/T_p + T_q \sin\omega t \tag{36}$$

Equation (36), thus, is in the form of equation (6) where $$A_{a0} = T_p/K_2 \tag{37}$$

and $$f_3(t) = T_q/K_2 \sin\omega t \tag{38}$$

From equations (33) and (38), $$K_1 = T_q/K_2 \tag{39}$$

The fundamental of $V_s$ may go through a phase shift. One of the two inputs to the synchronous detector may be phase shifted, if desired, to detect the fundamental precisely at its peak. A filter may also be provided for $V_s$, if desired, to attenuate the second and higher harmonics.

If equation (36) is true because $$e^s = 1 + s + s^2/2! + s^3/3! \ldots \tag{40}$$

$$e^s \cong 1 + T_q/\omega R \cos\omega t \tag{41}$$

where, $$s = T_q/\omega R \cos\omega t \tag{42}$$

and $$T_q/\omega R \ll 1. \tag{43}$$

Using equation (41), the differential equation (11) may be solved by simple integration, if desired. The expression for $V_s$ then contains only the following terms:

$$V_s = A_{d0} + A_{d1} \sin(\omega t + \phi_{d1}) + A_{d2} \sin(2\omega t + \phi_{d2}) + A_{d3} \sin(3\omega t + \phi_{d3})$$

That is, all the harmonics higher than the third have zero coefficients.

The operation of the invention may also be explained another way.

Under the initial assumption that the charge on the capacitive system comprising the modulator does not change during each sampling period, the total system charge is given by $$Q_T = CV_{DC}$$

where, $C_{MON}$ = total capacity of system, and
$V_{DC}$ = unknown kilovoltage to be measured.

The A.C. signal, which is a direct analog of the unknown D.C. kilovoltage, is developed by mechanically modulating one capacitor element so as to obtain a sinusoidal variation in capacity at some repetitive modulating frequency, we have
Initial conditions:

$$(C_{Dyn}. \text{ at rest}) \quad Q_0 = C_0 \times V_0$$

With incremental capacity increase $\Delta C$:

$$Q_1 = (C_0 + \Delta C) V_1$$

where,
$Q_o$ = initial charge on capacitor,
$Q_1$ = final charge on capacitor,
$V_o$ = initial voltage on capacitor, and
$V_1$ = final voltage on capacitor. Because of the action of Integrator $R_{Int} C_0$, $Q_o = Q_1$ (charge on system stays constant) and $$C_o \times V_o = V_1 (C_o + \Delta C)$$
$$C_o \times V_o = V_1 C_o + V_1 \Delta C$$
$$C_o \times V_o - V_1 C_o = V_1 \Delta C$$
$$C_o (V_o - V_1) = V_1 \times \Delta C$$

Assume, $$V_o - V_1 = \Delta V$$
$$C_o \times \Delta V = V_1 \times \Delta C$$
$$\Delta V = (V_1)/(C_o) \times \Delta C$$

or $$(\Delta C)/(C_o) = (\Delta V)/(V_o)$$

Assume the capacitance can be dynamically Varied by 0.1 percent or 1 part in 1,000. This would indicate a $\pm 1$ mil excursion for an electrode separation of 1 inch. Thus, $$\Delta C/C_o = 1/1,000$$

Assuming $V_o = 50 \times 10^3$ volts, $$\Delta V/50 \times 10^3 = 1/1,000$$
$$\Delta V = 50 \times 10^3 \times 10^{-3}$$
$$\Delta V = 50 \text{ volts}$$

$\pm \Delta V = \pm 50$ volts or 50 volts peak to peak (for a 50 KV DC signal)

The charging time constant must be calculated in order to determine if the charge on the system remains constant during a sampling period. Referring to the schematic, $R_I$, FIG. 1, 21, provides the resistive element of this low-pass network consisting of $C_{Dyn}.$ (23) $\times R_1$ assuming $$C_{Dyn}. (23) = 20 \text{ picofarads}$$
$$R_I = 500 \text{ megohms}$$
$$T = RC = 20 \times 10^{-12} \times 500 \times 10^6$$
$$T = 10^{-2} \text{ sec.} = 10 \text{ milliseconds}$$

For an excitation frequency of 1 KHz, this 10:1 ratio for the integrator is acceptable.

Continuing, the 1 KHz A.C. output signal is developed as the result of (a) the presence of a D.C. voltage at the input, (b) the dynamic capacity variation. Capacitance $C_c$ (27) serves as a decoupling and D.C. blocking capacity; in the configuration shown in FIG. 1, the dynamic capacitor blocks the high voltage D.C. and must be of the high voltage type. In FIG. 3, the decoupling capacitor also must block the maximum D.C. kilovoltage present during the period that the dynamic capacitor is discharged. The capacity $C_c$ is a matter of compromise between unwanted shunt loading (by a larger value), and reactive voltage division (as would result from $C_c << C_{Dyn.}$). A value of between 10 pF − 20 pF has been provisionally selected for $C_{Dyn.} \cong 25$ pF.

Envelope 10 in FIG. 2 may be evacuated or have a gas sealed therein (e.g., nitrogen, hydrogen or otherwise).

As indicated, $R_t$ is about 500 megohms; it is important, therefore, that the operational amplifier be of the high input impedance type and operated in the noninverting configuration as a voltage follower. In the circuit shown, the following relationships exist.

Input impedance:

$$Z_{in} = [A_o(W)Z_1]/[1 + (Z_f/Z_r)] \text{ [when } A_o(W) \text{ very large and } Z_{oi} << 1]$$

and

Closed loop gain (voltage transfer function):

$$V_{out}/V_{in} = 1 + (Z_f/Z_r) \text{ [when } A_o(W) \to \infty]$$

where,
$Z_i$ = intrinsic differential input impedance,
$Z_f$ = feedback impedance,
$Z_r$ = input impedance, inverting input,
$A_o(W)$ = intrinsic differential gain of op-amp.
Typical values should be $A_o(W) = 80$ db ($10^4$).
$Z_i = 100$ K ohm,
$Z_f = 50$ K ohm,
$Z_r = 50$ K ohm.
Yielding, $$Z_{in} = 5 \times 10^8 \text{ ohm} = 450 \text{ megohms}.$$

For high impedance source follower applications, it is important to select an operational amplifier that is not limited in attainable input impedance by base current that must be supplied by the source signal through the source impedance. Because of the relatively high magnitude of the modulating signal (to 15 volts) unity voltage gain only is required of this stage.

The A.C. signal available at the low impedance output of the source follower is applied to a synchronous detector sometimes called a suppressed carrier demodulator. This method is highly advantageous in that it is polarity sensitive; a terminal digital display can be mechanized to automatically indicate the sign of the unknown D.C. kilovoltage.

An important element of the invention is the high voltage variable capacitor. Critical performance requirements include:

a. High voltage integrity, assured dielectric withstand and corona-free operation.

b. Dynamic accuracy and reproducibility, i.e., constancy of modulation frequency, mechanical excursions, etc.

c. Ability to operate and maintain characteristics in reasonably adverse environments including high humidity, rough handling and ambient EMI (electromagnetic interference).

d. Operational safety and flexibility.

The insulator body 11 provides external dielectric integrity for the high voltage sampling. Eight inches of insulator should be acceptable for 50 D.C. potential in air. The center post 12 coaxial with the insulator body 11 couples to the fixed electrode 13. Since the carrier or excitation frequency is narrow band, i.e., ~ 1 kilohertz, noise rejection can be most effective and extensive shielding may not be required. The speaker is almost ideally suited for the application in that the motion of the moving coil and the supporting cone structure is essentially simple harmonic.

Excursion of 1–3 mils can be readily developed.

As indicated, external high voltage integrity is provided by the surface path along a quality insulator—typically glazed ceramic or glass. An open internal structure is used in the drawing to better depict component layout and approximate geometry. The dynamic capacitor and electrode structure may obtain its dielectric withstand capabilities from either $SF_6$ or the vacuum media. For cylindrical electrode structures of the approximate geometry shown, $SF_6$ at 1 atmosphere (absolute) should provide a 50 KV D.C. withstand capability with ¾-inch electrode separation. With vacuum or higher pressure $SF_6$ fill (3–5 atmospheres), much closer spacing is possible.

An alternative approach would be to employ an epoxy envelope for the probe and retain the $SF_6$ insulating environment for the capacitor. The use of dry air as a capacitor insulating medium, or risking exposure to ambient air, is possible but not preferred in view of the electrode spacing requirement for corona-free operation.

If $$(T_q/\omega R) << 1 \text{ and}$$
$$(T_p/\omega R) << 1,$$

equation (44) may be simplified to $$V_s = E [1 + (T_q/T_p)] \sin (\omega t - \theta)]$$

where $\theta = \arctan T_p/\omega R$.

In this case, the phase shift $\theta$ is trivial.

Note that if $$T_p/\omega R << 1, \text{ then}$$
$$T_p/\omega R << \pi/2,$$

where $\omega t = \pi/2$ is the point at which the synchronous detector samples the fundamental.

Note will be taken that to keep the phase shift of the fundamental small, the last two ratios should be much smaller than unity. This also keeps the magnitudes of the harmonics small, and this is desirable to maintain a high efficiency. Note that all of the harmonic currents flowing through the high voltage resistor may be unwanted and create an unnecessary power loss.

The phrase "fluid of a type and under a pressure such that the capacitors 23 and 53 have minimum voltage breakdowns greater than they do in air at one atmosphere" is hereby defined for use herein and for use in the claims to include, but not be limited to, fluid in a substantial vacuum ($10^{-4}$ Torr or $10^{-6}$ Torr, for example) or sulfur hexafluoride gas at, e.g. three atmospheres, because a perfect vacuum is not possible in that a certain amount of gas, even though very small, always remains in an evacuated chamber, i.e. a vacuum chamber, after pumping.

What is claimed is:

1. High voltage measuring apparatus comprising: a high voltage series circuit adapted to be connected across the output of an unknown high voltage D.C. source, said circuit including first and second elements connected in series, said first and second elements being a resistor and a variable capacitor, respectively;

an excitation source of an A.C. signal; means connected from said excitation source to increase and to decrease the capacitance of said variable capacitor periodically as a function of said A.C. signal; utilization means connected from the junction of said resistor and said variable capacitor, said utilization means including a D.C. blocking capacitor connected from said junction, a synchronous detector, intermediate means connected from the output electrode of said D.C. blocking capacitor to impress an A.C. voltage on said synchronous detector directly proportional to that appearing on the output electrode of said D.C. blocking capacitor, said synchronous detector also being connected from the output of said excitation source to produce a D.C. output voltage directly proportional to the peak amplitude of said A.C. voltage, said utilization means including a voltmeter connected from the output of said synchronous detector; said intermediate means including a differential amplifier, the output electrode of said D.C. blocking capacitor being connected to the noninverting input of said amplifier, the output of said amplifier being connected to the input of said synchronous detector, a first auxiliary resistor connected from the output of said amplifier to the inverting input thereof, and a second auxiliary resistor connected from a first point of reference potential to said inverting input.

2. The invention as defined in claim 1, wherein one end of one of said elements opposite the end thereof connected to the other is connected to a second point of reference potential, said amplifier, said synchronous detector, said excitation source and said voltmeter all being connected to said second point.

* * * * *